(No Model.)

W. SCOTT.
FLOAT VALVE.

No. 509,401. Patented Nov. 28, 1893.

Witnesses
Jas. J. Maloney
M. E. Hill

Inventor,
William Scott,
by Jos. P. Livermore
Att'y.

UNITED STATES PATENT OFFICE.

WILLIAM SCOTT, OF MEDFORD, MASSACHUSETTS.

FLOAT-VALVE.

SPECIFICATION forming part of Letters Patent No. 509,401, dated November 28, 1893.

Application filed March 14, 1892. Serial No. 424,805. (No model.)

*To all whom it may concern:*

Be it known that I, WILLIAM SCOTT, of Medford, county of Middlesex, and State of Massachusetts, have invented an Improvement in Float-Valves, of which the following description, in connection with the accompanying drawings, is a specification, like letters on the drawings representing like parts.

My invention relates to a float valve such as used in water tanks to control the supply pipe so as to maintain the liquid at the desired level in the tank.

The invention consists in novel features of construction whereby the valve is opened and closed promptly in response to the proper change in the level of the liquid, instead of being moved gradually by the rise and fall of the float as is usually the case.

The valve apparatus is shown in this instance as comprising a main valve which controls the flow of liquid from the supply pipe into the tank and is itself actuated by the pressure of the liquid controlled by it, its operation being governed by a secondary or controlling valve that is operated by the float. The said secondary valve is operated in proper direction to cause the main valve to open by a slight movement of the float but may be arranged so as not to be engaged by the float until the latter descends to substantially the lowest level that it is intended to permit the liquid to reach, and when thus opened by the float the controlling valve is engaged by a detent which retains it in open position irrespective of the movement of the float until the liquid reaches the highest level it is intended to have, when the float arm engages said detent and causes it to disengage the controlling valve which is immediately closed by the pressure of the liquid or a spring or both, and thus causes the main valve to close and the flow of liquid to cease, said closing being prompt and not being affected by slight vibrations of the float upon the surface of the liquid.

Figure 1:
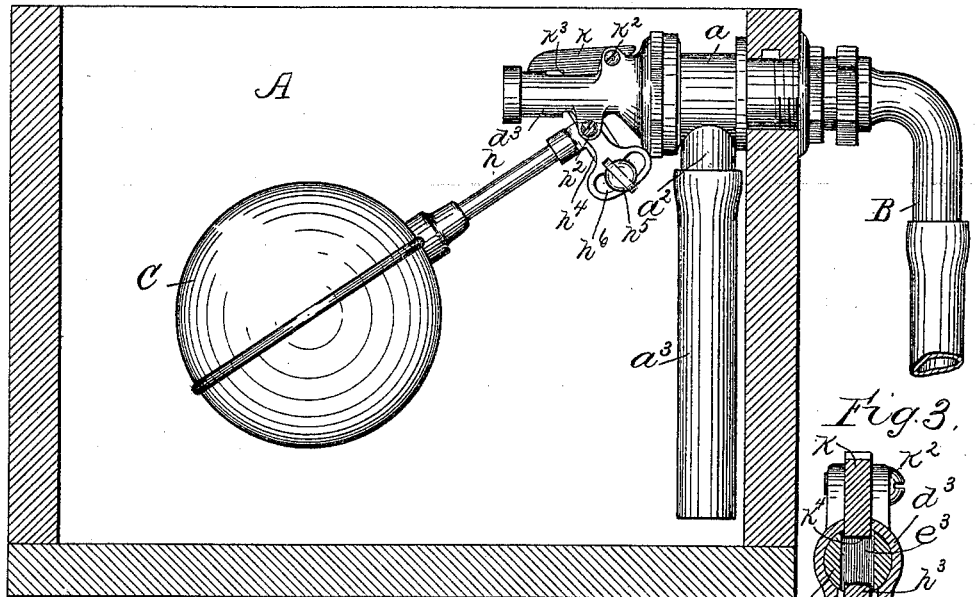
Figures 2, 3:
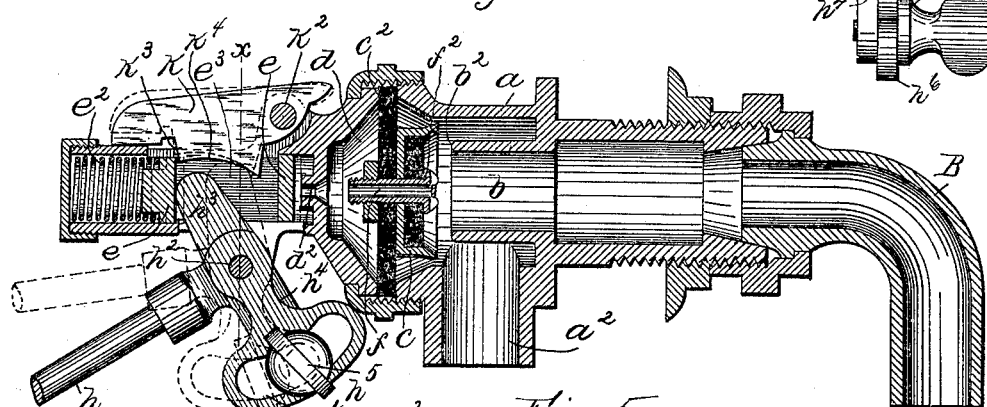
Figures 4, 5:
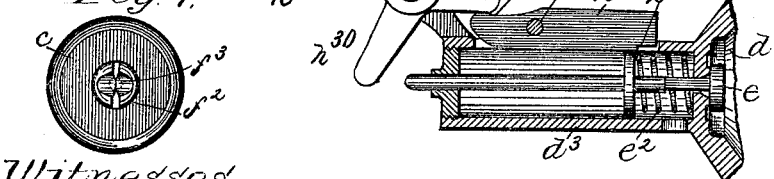

Figure 1 is a side elevation of a float valve apparatus embodying this invention, showing the tank in section; Fig. 2 a longitudinal section on a larger scale, of the valve proper; Fig. 3 a transverse vertical section on line $x$, Fig. 2; Fig. 4 a detail to be referred to, and Fig. 5 a sectional detail showing a modified construction of the secondary or controlling valve, and parts co-operating therewith.

The valve apparatus is shown in Fig. 1, as applied to a tank or reservoir A, and is represented as so adjusted that the tank will be substantially emptied when drawn upon, and then immediately caused to fill again. The liquid to fill the tank is supplied under pressure by the supply pipe B which terminates in the valve apparatus forming the subject of this invention. The said supply pipe B is connected with a valve shell $a$ which contains the delivery orifice $b$ of the said supply pipe the end of which forms a valve seat at $b^2$ inside of said chamber. The said valve seat is controlled by a main valve $c$ connected with a flexible diaphragm $c^2$ of considerably larger area than the area of the outlet $b$ said diaphragm $c^2$ constituting one wall of the chamber which has a discharge passage $d^2$ controlled by the secondary valve $e$. The space in the valve chamber $a$ around the outlet $b$ is provided with a large outlet passage $a^2$ shown in Fig. 1, as provided with an extension $a^3$ leading to near the bottom of the tank to enable the liquid to be delivered into the tank without splashing. The valve $c$ is provided with a small passage $f$ connecting the space in the valve chamber $a$ and the space in the chamber $d$ at the rear of the diaphragm $c^2$ said passage being shown in this instance as formed in a screw $f^2$ which fastens the valve to the diaphragm said passage terminating in the slot of the screw. By this construction a very convenient means for determining the effective area of this orifice is afforded, the said screw being of brass or malleable material and having a round head so that by striking the same with a hammer or die, as shown at $f^3$ Fig. 4, the head may be mashed in at the sides of the screw slot and over the end of the passage $f$ so as to close the same until only a minute passage is afforded. By thus partially closing the passage by the compression of the screw head the liquid has a less direct course through the passage $f$ and any solid particles that may be carried by it will be deflected, and prevented from entering the passage $f$ so as to clog the same and thereby prevent the valve from moving. This passage is directly in line with the outlet $b$ and if the regulating device $e$ is closed so that there is no outlet from the chamber $d$ the liquid being delivered under pressure from the outlet $b$ will pass through the passage $f$ and produce a pressure in the chamber $d$ over the entire rear surface of the diaphragm $c^2$ which pressure is substantially equal to that of the liquid issuing from the outlet $b$ and acting on the face of the valve $c$ but inasmuch as the valve chamber $a$ has a large and free outlet $a^2$ the pressure on the front or valve carrying side of the diaphragm $c^2$ outside of the periphery of the valve will be only very small. Thus under these conditions the diaphragm $c^2$ will be acted upon by an unbalanced pressure tending to force the valve $c$ up to its seat $b^2$ so that said valve will thus close and will remain closed as long as there is no outlet from the chamber $d$ so that the pressure is maintained therein.

In order to cause the main valve $c$ to open it is necessary therefore to relieve the pressure in the chamber $d$ on the rear side of the diaphragm $c^2$ which is done by opening the valve $e$ and thus permitting the contents of the chamber $d$ to discharge through the opening $d^2$ which is sufficiently large with relation to the effective area of the passage $f$ through the diaphragm to substantially reduce the pressure in the chamber $d$ when the said valve $e$ is opened, so that the diaphragm $c^2$ is then acted upon by the unbalanced pressure of the liquid in or issuing from the outlet $b$ and is thus kept open. The said controlling valve $e$ is operated upon the proper change in the level of the liquid in the tank A by the float C and co-operating appliances, which will now be described. The said valve $e$ is shown in Fig. 2, as seating against the pressure of the liquid in the chamber $d$ and is acted upon by a spring $e^2$ sufficiently strong to overcome the said pressure so that the normal tendency of the said valve is to close and remain closed. The float C is connected with the float arm $h$ pivoted at $h^2$ upon the casting in which the chamber $d$ is formed and the valve $e$ works. The said arm $h$ is connected with an actuating finger or projection $h^3$ which in the construction shown in Figs. 2 and 3, works in a slot $e^3$ in the valve $e$ which is in this construction substantially a slotted plug working in a cylindrical guide $d^3$. When the liquid is drawn off from the tank A the float C of course descends and when it arrives at the desired level the float arm arrives at the position shown in full lines Fig. 2, the finger $h^3$ then engaging the valve $e$ and the weight of the float overcoming the spring $e^2$ and thus opening the said valve as shown in said figure. This operation relieves the pressure in the chamber $d$ and causes the main valve $c$ to open as before described so that the tank begins to fill and the float to rise again. If the valve were controlled only by the finger $h^3$ it would almost immediately close again thus causing the main valve to close and prevent the tank from filling. Such result is prevented in accordance with this invention by the detent $k$ pivoted at $k^2$ and provided with a shoulder $k^3$ that engages the valve when opened by the finger $h^3$ the said shoulder $k^3$ then dropping so as to engage the said valve and prevent it from closing when the finger $h^3$ moves away as the float rises.

In order to cause the valve to close when the tank is filled or the liquid therein rises to the desired level, the said detent is provided with an engaging surface $k^4$ which when the float arm arrives at its highest position as indicated in dotted lines Fig. 2, is engaged by the actuating finger $h^3$ thus causing the detent $k$ to be moved from full to dotted line position thereby releasing the valve $e$ which is at once closed by the action of its spring $e^2$.

In the modification shown in Fig. 5, the combination of parts and mode of operation are substantially the same as has just been described, and the corresponding parts are marked with the same reference letters, but the valve is represented as opening into the chamber $d$ and against the pressure of the liquid therein. In other words, its movement with relation to the position of the other parts in opening and closing is the opposite to that of the valve $e$ represented in Fig. 2, and the float arm $h^3$ is therefore pivoted at the opposite side of the valve, that is, above instead of below the axis of the valve, and in order to conveniently operate the detent $k$ the float arm is provided with a second finger, instead of operating the detent by the same finger that operates the valve. In other words, the two functions of the arm $h^3$ Fig. 2, are performed by the two arms $h^{30}$, $h^{31}$, in the modified construction shown in Fig. 5.

It is sometimes desirable to change the position of the float and float arm, with relation to the valve apparatus, as it may be necessary to mount the latter at various places on the tank. In order to effect this adjustment, the said float arm $h$ may be connected with the actuating finger $h^3$ as best shown in Figs. 1 and 2, the said finger being independently pivoted on the same axis $h^2$ and adjustably connected with the said float arm $h$. As shown in this instance the said float arm is made in the form of an elbow lever having its arm $h^4$ provided with a clamp screw $h^5$ that may be locked at any desired point with relation to the actuating finger $h^3$ which is extended across its pivot $h^2$ over the arm $h^4$ and provided with a curved slot $h^6$ that receives the clamping screw $h^5$. Thus by loosening the said clamping screw and shifting the position of the float arm $h$ relative to the actuating finger $h^2$ the positions or levels at which the float will cause the valve to open and close may be varied as desired.

The invention is not limited to the specific details of construction and arrangement shown, as it is obvious that the usual mechanical equivalents or substitutes may be employed, such for example as a piston instead of the diaphragm, and the term "diaphragm"

is intended to include any equivalent device having similar areas acted upon by pressures in the relation herein shown and described for thus acting upon the diaphragm $c^2$.

I claim—

1. A float valve apparatus comprising a delivery pipe, a main valve controlling the delivery pipe and operated by the pressure therein, and a chamber to which pressure is admitted past the main valve to react thereon and having an outlet, combined with a controlling valve for the said outlet to govern the application of pressure to the said main valve, a detent for said controlling valve, a float, and means interposed between the float and said controlling valve and detent to actuate the latter, substantially as described.

2. A float valve apparatus comprising a delivery pipe, a main valve controlling the delivery pipe and operated by the pressure therein, and a chamber to which pressure is admitted past the main valve to react thereon and having an outlet, combined with a controlling valve for the said outlet to govern the application of pressure to the said main valve, a detent for said controlling valve, an adjustable float, and means interposed between the float and said controlling valve and detent to actuate the latter, substantially as described.

3. A float valve apparatus comprising a delivery pipe, a main valve for controlling such pipe and operated by the pressure therein, a pressure chamber, a diaphragm dividing such chamber and supporting the main valve, an outlet in the chamber on the side of the diaphragm opposite to that on which the main valve is arranged, and a contracted or constricted passage through the diaphragm for the flow of pressure to the outlet, combined with a controlling valve for the said outlet to govern the application of pressure to the said main valve, a detent for said controlling valve, a float, and means interposed between the float and said controlling valve and detent to actuate the latter, substantially as described.

In testimony whereof I have signed my name to this specification in the presence of two subscribing witnesses.

WILLIAM SCOTT.

Witnesses:
JOS. P. LIVERMORE,
JAS. J. MALONEY.